United States Patent
Ahlgren

(12) 
(10) Patent No.: US 6,293,802 B1
(45) Date of Patent: *Sep. 25, 2001

(54) HYBRID LESSON FORMAT

(75) Inventor: David R. Ahlgren, Cardiff, CA (US)

(73) Assignee: Astar, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,586

(22) Filed: Jan. 29, 1998

(51) Int. Cl.[7] .................................................. A63B 69/36

(52) U.S. Cl. ........................ 434/252; 434/257; 473/199; 473/266; 473/234

(58) Field of Search .................................... 434/252, 247, 434/257; 473/266, 199, 234, 269, 409

(56) References Cited

U.S. PATENT DOCUMENTS

| | | | |
|---|---|---|---|
| 5,249,967 | * 10/1993 | O'Leary et al. | 434/247 |
| 5,419,562 | * 5/1995 | Cromarty | 273/183.1 |
| 5,486,001 | * 1/1996 | Baker | 273/183.1 |
| 5,697,791 | * 12/1997 | Nashner et al. | 434/247 |
| 5,797,805 | * 8/1998 | Lubell et al. | 473/266 X |
| 5,823,786 | * 10/1998 | Easterbrook | 434/247 |
| 5,868,578 | * 2/1999 | Baum | 434/247 |
| 5,904,484 | * 5/1999 | Burns | 434/252 |

* cited by examiner

Primary Examiner—Valencia Martin-Wallace
Assistant Examiner—Chandra Harris
(74) Attorney, Agent, or Firm—Lyon & Lyon LLP

(57) ABSTRACT

A hybrid format for representing a video lesson which is transported from a first location to a second location across a communication channel includes a first item having a first format type and a second item having a second format type. The first format type is different from said second format type, yet the lesson can be played to the student as if it were a single contiguous data item. As such, efficiencies can be obtained in storage and transfer.

11 Claims, 9 Drawing Sheets

HYBRID LESSON FORMAT

RELATED APPLICATIONS

The present application is related to copending United States patent application Ser. No. 09/015,586, titled "System and Method for Remote Instruction" which is filed concurrently herewith and incorporated herein by reference in its entirety.

BACKGROUND OF THE INVENTION

1. Field of the Invention

The present invention relates generally to data formats, and more particularly to a system and method for providing a hybrid lesson format.

2. Related Art

A common challenge facing instructors in a variety of disciplines is that of presenting training materials to the students in an effective manner. To meet this challenge, instructors have developed aids to supplement the live lecture. For example, instructors will often utilize audio/visual aids, labs, workshops, role playing and other techniques to enhance the learning experience.

A particular challenge, however, is presented to instructors who teach students in physical activities such as, for example, sports. Not only do these students require information regarding the activity and how it is performed, but they also require feedback on their own technique and how to improve their own personal styles.

To address this challenge, instructors have often turned to the video recorder. Using this approach, instructors typically record the student performing the activity, and play the recording to the student so that he or she can see the areas where improvement is required. The student can also compare the video playback of his or her technique with that of a professional and use this information to improve the technique.

Such techniques are commonly used in a variety of activities, especially sporting activities. For example, golf pros have long been using the video camera to allow golf students to view their swing and see for themselves what they are doing wrong. More recently, advanced video systems have been made available to enhance this learning experience. One such system is the ASTAR 400, available from ASTAR, Inc. of San Diego, Calif. The ASTAR system is used by golf professionals across the country and throughout the world to enhance their golf lessons. The ASTAR system captures the student's golf swing on video tape and allows it to be played back to the student in regular, slow motion and still frame. Recorded swings of golf pros can be recalled from storage and played side-by-side with the student's swing for a direct comparison.

SUMMARY OF THE INVENTION

According to one or more embodiments of the invention, one or more capture stations can be utilized in conjunction with one or more analysis stations at a remote location or locations to provide remote training for a student in a given discipline. For example, this patent document discusses the invention in terms of one or more embodiments where the subject of instruction is a sporting activity such as golf.

According to one or more embodiments of the invention, a capture station is utilized to capture the student's activity such as, in the example of the golf instruction embodiment, the student's golf swing. The captured motion is forwarded to a remote analysis center where it can be reviewed by a qualified instructor and a personalized lesson prepared for the student based on the captured student's motion. In the golf example frequently described herein, the student's golf swing is captured at a capture station and forwarded to an analysis center. At an analysis center, a golf instructor such as for example a golf pro or other qualified instructor, reviews the captured swing and prepares a personalized lesson, instructing the golfer how he or she might improve on his or her swing. The personalized lesson is forwarded to the student at the original capture station, at another capture station, or at some other location (referred to as a "playback station") where it is played back by the student so that he or she may receive the personalized lesson.

In one embodiment, the invention can be implemented utilizing any of a variety of communications media between capture stations and analysis centers. In fact, in one embodiment, one or more routing centers can be utilized to manage the flow of traffic (i.e. captured motion and personalized lessons) between capture stations and analysis centers.

In one embodiment the communications medium utilized between the capture stations and the analysis centers, is the Internet, although alternative communications media can be utilized. In an Internet embodiment, the routing centers can be implemented as servers, such as web servers to manage the flow of traffic typically encountered in an Internet environment.

According to one embodiment of the invention, motion capture technology can be implemented to capture the appropriate portion of the student's motion, save that appropriate motion, and forward only that appropriate motion to the analysis center. In this manner, unnecessary or unneeded motion need not be captured and transferred between capture stations and analysis centers. In one embodiment of the invention, the motion capture technology utilizes a sound pressure level sensor to recognize that an event has occurred. This event recognition can then be used to define the motion, or a time frame of the motion to be captured, stored, and forwarded to an analysis center. For example, in the golf instruction embodiment, a mechanism can be used to detect the impact of the student's club head with the golf ball. Once this event is detected, the capture center can be programed to capture or save a pre-determined amount of captured motion before and after the indication of the event. For example, it may be determined that it is appropriate to capture two seconds of motion video prior to the occurrence of the event and one second after the occurrence of the event, to capture a full back swing and follow through of a golf swing.

In one embodiment, a circular buffer can be implemented utilizing random access memory or other data storage to capture a motion in a continuous loop. The start and stop times in the circular buffer utilized to define the captured motion ultimately forwarded to the analysis center, is based on the occurrence of the triggering event. Thus, one feature of the invention is that only a pre-determined and limited amount of motion needs to be captured, stored and forwarded to analysis centers, thus conserving memory and communication bandwidth resources.

Numerous features can be implemented and utilized in preparing the personalized lesson at an analysis center. For example, according to one embodiment, the instructor can retrieve the personalized swing and add additional information to be included with the captured swing in preparing the personalized lesson. For example, the instructor may wish to add graphic overlays to the swing to help illustrate a suggested improvement to the student's swing. An instructor may add "chalk lines" over a still frame of the student's captured swing to illustrate, for example, proper club or body position. Preferably, the instructor can also include a vocal/audio recording, providing a narrative of the personalized lesson. In this manner, audio and perhaps even the student's swing with included graphics can be provided back to the student as part of the personalized lesson. Pre-recorded audio items such as music or other narratives or instructions can also be included as part of the personalized lesson.

In one embodiment, the instructor may decide to provide pre-recorded materials as part of the personalized lesson. These pre-recorded materials can include, for example, pre-recorded drills, exercises, instructions, or other pre-recorded audio/video data items. These items can be retrieved by the instructor from local storage accompanying the analysis center. Alternatively, in one embodiment an identification of selected pre-recorded materials is packaged and included with the personalized lesson. Upon playback at a capture or other playback station, the playback station receives the identification as part of the personalized lesson and utilizes this identification to retrieve the identified material (i.e. drill or other material) from local storage. In this manner, full motion video of a pre-recorded drill does not have to be transferred across a communications channel from the analysis center to the playback station. Instead, all that needs to be transmitted is a short identifier such as, for example, a file name or other identification. In this manner communications bandwidth can again be preserved.

According to yet another feature of the invention, the student's swing can be captured as a series of still frames referred to as key frames. These key frames are freeze-frame pictures of the key portions of the student's swing. In one embodiment, it is only these key frames which are transferred from the capture station to the analysis center as opposed to transferring the full motion video of the student's captured motion.

According to yet another feature of the invention, split screen or windowing effects can be utilized to allow the student to directly compare his or her swing to that of a professional or other skilled golfer. In one embodiment the key frames of the student can be synchronized with the key frames of the professional to allow critical portions of the swing to be directly compared between the student and the professional. In this manner, the student can better visualize areas where his or her swing needs improvement. In one embodiment, the personalized lesson is formatted such that no student interaction is required during playback to enable this feature. For example, in reviewing a student's swing, the instructor may determine that it would be useful for the student to compare a portion of his or her swing with that of a pro. In this case, the instructor can simply build into the personalized lesson the feature of providing a still frame, or even series of still frames of the student's swing in a tiled window arrangement with the same frame or series of frames from a professional. As with the drills, exercises and other materials, the pro swings can either be stored at analysis centers and transmitted with the personalized lesson or they can be retrieved locally by the playback station during lesson playback.

Further features and advantages of the interface system as well as the structure and operation of various embodiments of the interface system are described in detail below with reference to the accompanying drawings.

DETAILED DESCRIPTION OF THE INVENTION

The present invention is directed to a system and method for providing remote instruction to students in a variety of activities. In accordance with one embodiment of the invention, a series of video images of the student performing the activity is captured. The series can be one or more still images, or a complete series of images making up a full motion video of the swing. The series of images is forwarded to an instructor at a remote location. The instructor reviews the series of images and generates a lesson utilizing the student's clip and other supplemental information. The lesson is forwarded to the student where he or she can review the lesson.

The invention can be implemented with a variety of activities in which it is useful to allow students to view their own performance. However, to simplify discussion of the invention, it is described in this document in terms of an example application. Specifically, the invention is described in this document as a tool used to facilitate remote instruction of golf students. After reading this description, it will become apparent to one of ordinary skill in the art how to implement the invention in numerous alternative applications, including other sporting activities as well as a variety of non-sports-related physical or motion-related activities.

Figure 1:
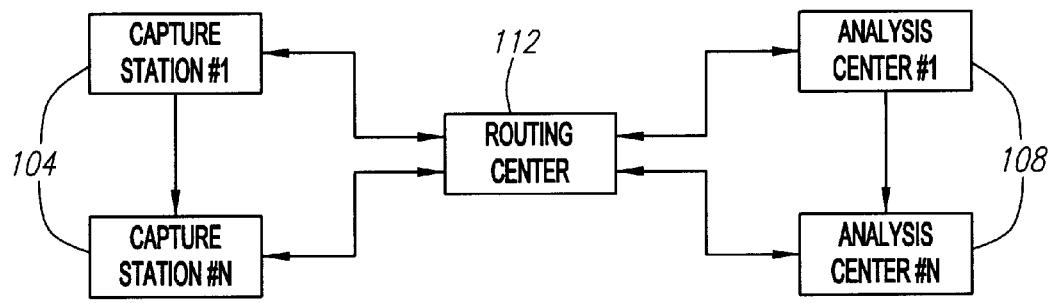
FIG. 1 is a block diagram illustrating an example implementation of one embodiment of the invention.

The present invention is now described in terms of the example application to golf instruction introduced above. FIG. 1 is a high level block diagram generally illustrating an implementation of the invention in accordance with one embodiment. In one embodiment of the invention one or more capture stations 104 are used in conjunction with one or more analysis stations 108 to capture the golfer's swing and to allow an instructor to critique the swing and build a lesson. The lesson is then returned to the customer for the customer to view at a capture station 104 or elsewhere. The system can also include one or more routing centers 112 (one illustrated) which can be used to route captured swings and prepared lessons among a plurality of capture stations 104 and analysis centers 108.

Figure 2:
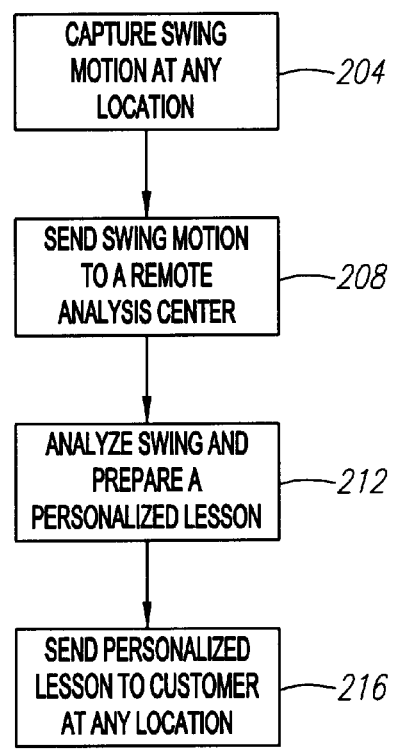
FIG. 2 is an operational flow diagram illustrating a process for performing remote instruction according to one embodiment of the invention.

FIG. 2 is an operational flow diagram generally illustrating a process for remote instruction according to one embodiment of the invention. According to the illustrated embodiment, in a step 204 the golfer's swing is captured at a capture station 104. Preferably, capture station 104 can be located at a location remote from an analysis center 108. Indeed, in accordance with one embodiment of the invention, one or more capture stations 104 are positioned at various locations such as, for example, golf pro shops, golf retail outlets, driving ranges, shopping malls, and virtually any other location where it may be appropriate or desirable to capture a student's golf swing.

Once the swing is captured, it is forwarded to a remote analysis center 108 as illustrated by step 208. The communication path between the capture station 104 and analysis center 108 can be implemented using a variety of communication techniques. For example, in one embodiment the communication media by which the swing is transmitted to the analysis center 108 is the Internet. However, alternative communication media are contemplated including, for example, wireless communications interfaces, alternative network configurations, direct hardwire interfaces and direct phone line connections. In embodiments where a routing center 112 is implemented routing center 112 can be used to coordinate the transfer of swings and lessons among capture stations 104 and analysis centers 108 and can also insure that a captured swing is transmitted to a selected one of the plurality of analysis centers 108.

In a step 212 an instructor, such as, for example, a golf pro or other instructor, views the captured swing, analyzes the swing, and prepares a personalized lesson for the student. Automated tools can be utilized in the step to aide the lesson preparation. In a step 216 the personalized lesson is sent to the student at a designated location. In this step, routing center 112 can also be used to facilitate the routing of the personalized lesson from analysis center 108 to the appropriate one of a plurality of capture stations 104.

In one embodiment, the personalized swing is sent back to the same capture station 104 at which the swing was captured. In this embodiment, the student simply returns to the location where he or she recorded the swing and views the lesson at that location. Alternatively, the personalized lesson can be sent to another designated location such as, for example, a different capture station 104 or the student's home computer. In a preferred embodiment, when the student's swing is captured, the student can choose the playback station to which the personalized lesson is returned. In this document the term "student's home" is used to generally refer to any location at which the student has access to a computer which can be utilized as a capture station 104 or playback station. This can include, for example, the student's home, office or other location.

Both capture stations 104 and analysis centers 108 can be implemented utilizing a general purpose computer programmed to perform the described functions and including the appropriate peripherals and interfaces to allow swing capture and user interaction by both the student and the instructor. In one embodiment, capture stations 104 and analysis centers 108 are implemented using a Pentium®-based processor with 16 to 32 megabytes of random access memory (RAM), data storage such as a hard disk drive for storing program instructions as well as captured swings and other items as described below, a color monitor to display the captured swing and the prepared lessons, and a user-interface including, for example, a keyboard and mouse. Capture stations 104 can also include motion capture technology to capture the series of images of the student's swing.

Routing center 112 can also be implemented utilizing a general purpose computer program to perform the functions described herein. In one embodiment, routing center 112 is a Pentium®-based server with the appropriate interfaces to manage the transfer of captured swings and prepared lessons among the various capture stations 104 and analysis centers 108. As discussed in detail below, in one embodiment routing center 112 also includes the functionality to provide supplemental messaging among capture stations 104 and analysis centers 108. Routing center 112 can also be used to track lessons and other activities occurring among capture stations 104 and analysis centers 108 for billing, accounting, record keeping and other purposes.

As briefly mentioned above, one or more capture stations 104 can be provided at any of the variety different locations to capture the student's swing. Because a communications interface is utilized between capture stations 104 and analysis centers 108, there is virtually no limitation to the locations at which capture stations 104 or analysis centers 108 can be located. Indeed, with this technology it is readily apparent that a capture station 104 located anywhere in the world, including a remote location, can capture a swing and forward the swing for analysis to any of a plurality of analysis centers 108 anywhere else in the world. All that is required is a source of power and a communications interface.

Figure 3:
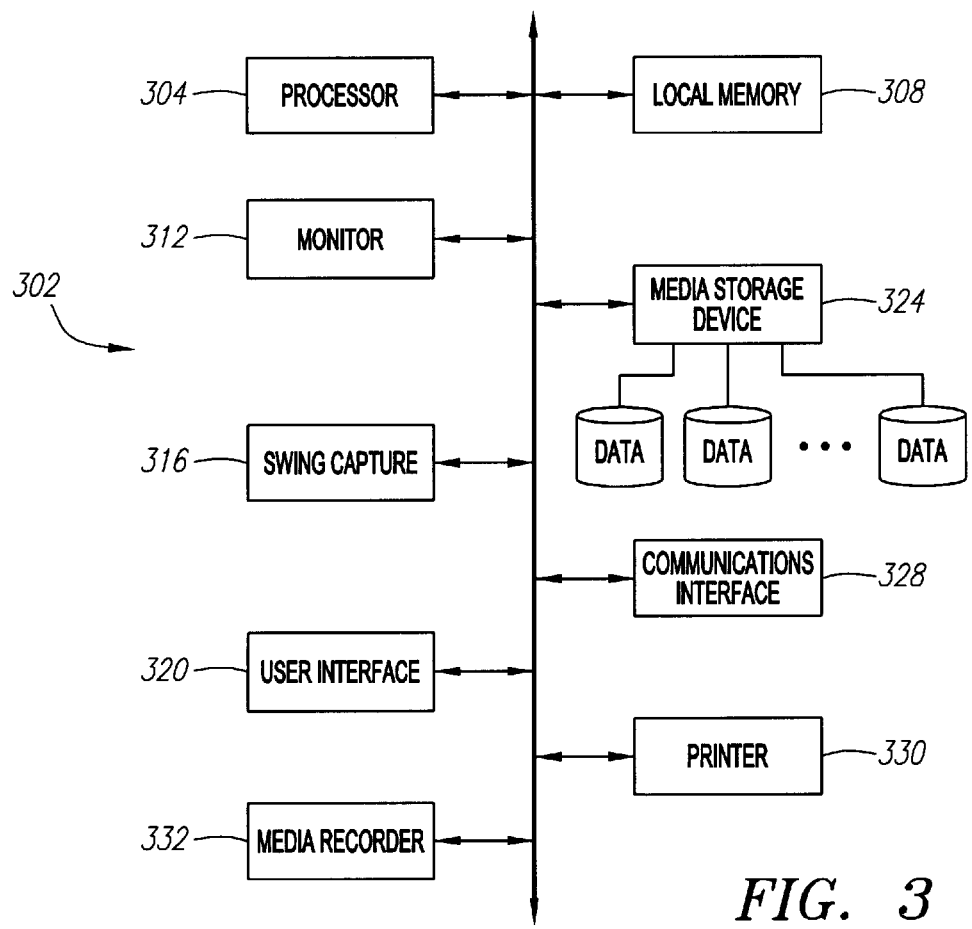
FIG. 3 is a block diagram illustrating an example architecture for a capture station according to one embodiment of the invention.

FIG. 3 is a block diagram generally illustrating an example implementation of a general purpose computer which can be used to implement capture stations 104, routing center 112 or analysis centers 108. As would become apparent to one of ordinary skill in the art after reading the following description, the functionality described with reference to FIG. 3 can be implemented using alternative architectures.

In the implementation illustrated in FIG. 3, capture station of 104 includes a processor 304, local memory 308, a monitor 312, a swing capture device 316, a user interface 320, the immediate storage device such as a media storage 324, a communications interface 328, a printer 330, and a media recorder 332. In the implementation illustrated in FIG. 3, the various components are interconnected using a central bus structure 302. Processor 304 can be implemented utilizing any of the variety of processors or processor sets including, for example, a Pentium® or an X86 microprocessor. Media storage can be implemented using a disk drive or other storage medium.

Local memory 308 is preferably implemented utilizing memory having fast access times such as, for example, random access memory (RAM). Local memory 308 can be utilized to store instructions and other data used by processor 304 in executing the functionality disclosed herein. Local memory 308 can also be utilized to serve as the capture buffer for storing the swing being captured or a lesson. Long term storage of data, program instructions, and captured swings is provided by media storage device 324. Preferably, media storage device 324 is implemented using a disk drive such as for example a hard disk drive or a floppy disk drive. Media storage 324 can also provide storage for additional data structures such as, for example, swing libraries, lesson clip libraries, promotional materials and other pertinent or useful data.

As discussed below, in one embodiment additional items can be provided as part of the personalized lesson including, for example, pre-recorded drills, exercises, instructional clips, example swings by professional or other experienced golfers, pre-recorded lesson clips, commercial and promotional materials, and other data items. It is preferable that in one embodiment of the invention, a library within capture station 104 is established to save various pieces of data useful in the swing capture and lesson playback operations in accordance with the invention. For example, the library can be utilized to store a plurality of swing clips captured for one or more students who have used the capture station 104. Additionally, as discussed in more detail below, data items such as example or professional swing clips, prerecorded training drills, exercises, instructional clips, promotional materials, swings from multiple camera angles, multiple swing types and club swings, and other audio/video data items may be stored in the library for later recall. The items stored in the data library can easily be categorized, imported and exported as required. Although the library is preferably implemented using a disk drive, alternative storage media can be utilized to implement the library.

A communications interface 328 can be provided to allow capture stations 104 to communicate with analysis centers of 108 either directly or via routing centers 112. In an Internet embodiment, communications interface 328 can be implemented utilizing a modem or other communications device suitable for communicating data across the Internet. Additional or alternative communications interfaces can be provided including both hard-wired and wireless communications interface to allow the sharing of data and other information between capture stations 104 and other entities such as routing centers 112, analysis centers 108, and other devices.

Monitor 312 provides a display by which a student can view his or her captured swing, the personalized lesson received from an analysis center 108, or other information. In one embodiment, monitor 312 is implemented utilizing a conventional cathode ray tube (CRT) display monitor such as that commonly used with conventional personal computer applications. As discussed below, additional features and enhancements can be provided to allow split screen windowing, on screen graphics, a touch screen interface and other features to enhance the student's lesson.

A swing capture device 316 allows the student's swing to be captured for subsequent forwarding to an analysis center 108. As discussed below, in one embodiment swing capture device 316 includes both video capture technology coupled with a detection device to allow a selected amount of video information to be captured for a swing.

User interface 320 allows the student or other user to interact with capture stations 104. A typical user interface can include, for example, a keypad or keyboard, a mouse or other pointing device, a touch screen display, or other input devices.

Additionally, a printer 330 and recorder 332 can be included to allow hard copy outputs to be provided to the student or other user. For example, in one embodiment as described below, capture station 104 can print a custom swing frame on a selected background providing the student with a souvenir of his or her lesson. In this embodiment, a device such as printer 330 can be utilized to provide this functionality. Additionally, in embodiments where capture station 104 is utilized as a location where the student also plays his or her personalized lesson, a recorder 332, such as, for example, a video tape recorder can be utilized to make a copy of that lesson on videotape, on disk, or other suitable recording medium. In this embodiment, the student can obtain a copy of the lesson for playback at his or her leisure as often as he or she desires.

As would become apparent to one of ordinary skill in the art after reading this disclosure, an architecture similar to that illustrated to that in FIG. 3 can be implemented to provide the functionality for routing stations 112 and analysis centers 108. As would also be apparent to one of ordinary skill in the art, all of the functionality illustrated in FIG. 3 need not be provided in routing centers 112 and analysis centers 108. For example, it is not necessary that routing centers 112 include a swing capture device 316 or a media recorder 332.

Figure 4:
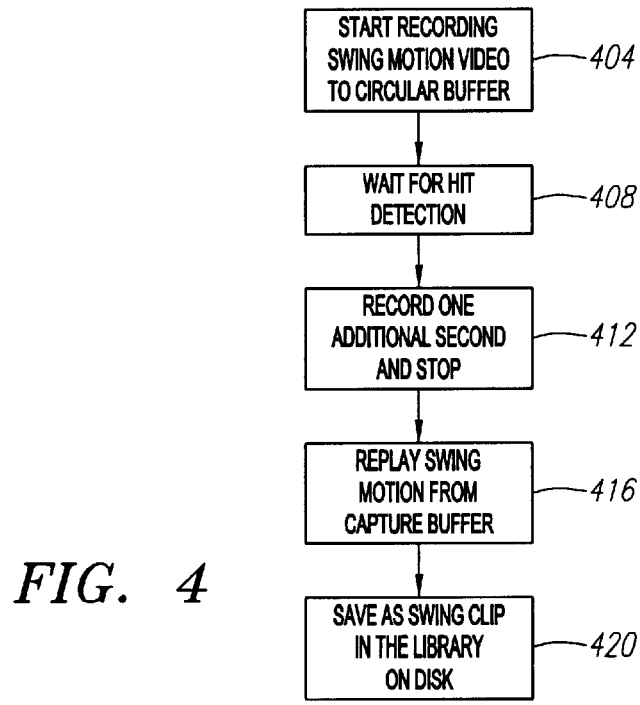
FIG. 4 is an operational flow diagram illustrating a process for capturing motion technology according to one embodiment of the invention.

As briefly described above, the present invention captures the student's golf swing and the capture station. FIG. 4 is an operational flow diagram illustrating a process by which the swing can be captured in accordance with one embodiment of the invention. In a step 404, the recording is begun. In a preferred embodiment the recording occurs continuously and the images are saved into a circular buffer. Because the buffer is circular, it effectively implements a continuous recording loop. The length of recording loop can be designated based on the amount of time it is typically expected for the student to take a complete golf swing. Of course, for alternative implementations with other activities, the length of the recording loop (i.e., the size of the buffer) can vary depending on the anticipated amount of recording time required.

Although the preferred embodiment uses random access memory to implement the recording loop, alternative memory devices can be utilized including magnetic and optical disk drives and even conventional video tapes. However, as described below, capture stations 104 are preferably implemented using random access memory as a circular buffer. RAM is preferable to disk memory due to its faster access times.

Additionally, a preferred embodiment of the invention utilizes video compression techniques to minimize the amount of storage space required to implement the storage loop. In one embodiment, with compression techniques used, the circular buffer can be implemented using 6 to 10 megabytes of random access memory or disk drive memory.

In one embodiment, the compression of the video is based on the content. Therefore, the buffer size of the circular buffer anticipates the lowest compression ratio. In one embodiment the compression technique utilized is the DC20 plus compression technique by MIRO of Germany.

In a step 408, the recording of the video images to the circular buffer continues until a hit detection occurs. In one embodiment, the hit detection is triggered based on a sound-pressure-level or volume detection. That is, when the sound of the student's golf club hitting the golf ball is detected, a hit detection is registered. One embodiment for implementing this hit detection strategy is discussed in greater detail below with reference to FIG. 5. Alternative hit detection strategies can be implemented including, for example, optical sensors motion sensors, a manual switch, a foot switch and other sensor or trigger technologies In a step 412, once the hit detection is registered, recording of the video images continues for a predetermined period of time. In the golf instruction embodiment, the preferred predetermined time interval for this post-recording step is one second. Additionally, the preferred buffer size in the golf swing embodiment is 3 to 4 seconds total. In an embodiment where the buffer size is 3 seconds and the post-recording time is one second, the image stored in a circular buffer is the student's swing 2 seconds prior to impact with the ball and 1 second after impact with the ball. The swing captured in the buffer can be saved to a more permanent storage medium such as, for example, a magnetic or optical disk.

In a step 416, the swing is replayed to the student. As discussed above, capture stations 104 can include a video monitor such as, for example, a standard computer CRT display. If the student is satisfied that the captured swing portrays an accurate representation of this student's swing, the swing is saved as a swing clip in a library in a disk drive or storage device in capture station 104. In one embodiment, the student is given more than one opportunity to capture an appropriate or representative swing.

Figure 5:
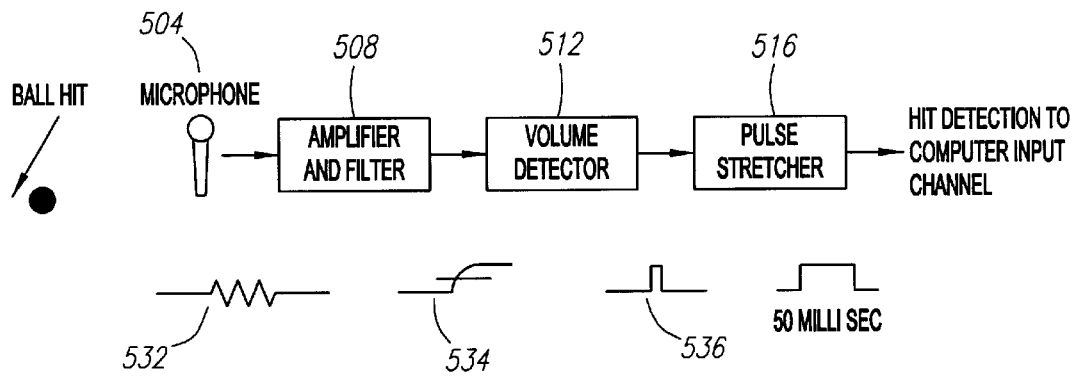
FIG. 5 is a block diagram illustrating hit detection according to one embodiment of the invention.

As discussed above with reference to step 408, the swing finally captured in the circular buffer is triggered based on a hit detection. FIG. 5 is in a block diagram illustrating an example implementation of a hit detector in accordance with one embodiment of the invention. The hit detector in accordance with the embodiment illustrated in FIG. 5 includes a microphone 504, an amplifier and filter 508, a volume detector 512, and a pulse stretcher 516.

In operation, microphone 504 detects the impact of the club as it strikes the ball. This signal 532 is amplified and filtered by amplifier and filter 508. A result in output 534 is input to volume detector 512 to determine whether the output rises above a predetermined threshold or trigger level. If so, a pulse 536 is output from volume detector 512. Pulse stretcher 516 stretches the width of pulse 536 such that the pulse is detectable by the capture stations' processor. In a preferred embodiment the stretched pulse width is 50 milliseconds which is sufficient length of time for the CPU to read the pulse during normal interrupt polling. It would be apparent to one of ordinary skill in the art after reading this description that alternative hit detection technologies can be implemented including alternative volume detectors as well as infrared motion sensors, optical sensors, and the like. Additionally, a manual push button implementation can be utilized.

Figure 6:
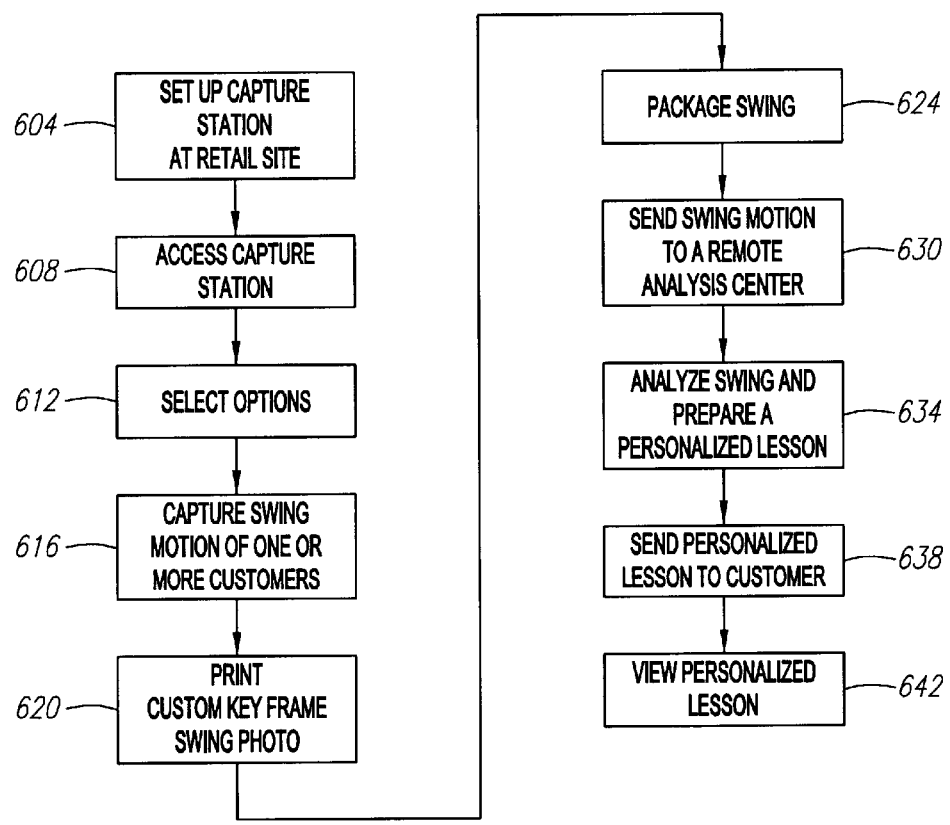
FIG. 6 is an operational flow diagram illustrating the capture of a swing and the preparation of a personalized lesson according to one embodiment of the invention.

As described above, capture stations 104 can be implemented at any of a variety of locations including retail golf centers, pro shops, driving ranges, shopping malls, hotel and resort areas and any other location where prospective students may wish to take a lesson. In one implementation of the invention, capture stations 104 can be located at a retail establishment where the swing is captured and forwarded an analysis center 108. One example embodiment of this application is now described with reference to FIG. 6. In a step 604, one or more capture stations 104 are established at a retail facility. In this embodiment, students who are patrons of the retail establishment can take advantage of capture stations 104 and avail themselves of the training that it provides.

In a step 608, once a patron decides to utilize the invention, the patron accesses capture station 104. Several embodiments can be provided to enable payment by or billing of the student.

In a step 612, after the student has accessed capture station 104 in one embodiment the student is provided with options regarding the services or lessons to be provided. For example, the student may be provided with the option of selecting a single individual lesson, or prepaying for a group of a series of lessons. Additionally, the type of instruction can be selected including, for example, whether a full or partial lesson is requested.

In one embodiment, the student can select which of a plurality of instructors or analysis centers 108 are to provide the lesson. Additionally, the student may be asked to enter student demographic information such as, for example, the student's name and address and a location to which the student would like the completed lesson sent. As discussed in more detail below, the student may elect to have the lesson returned to a variety of locations such as, for example, the capture station 104 at which his or her swing was captured, to any other capture station 104, or to the student's personal computer.

Additionally, in one embodiment, the student may elect to store a history of his or her swings captured. This can be useful for subsequent playback to review progress or for other data reference points. In one embodiment, the student may be able to purchase storage rights on a capture station 104, or at a routing center 112, to store his or her swing history.

In yet another alternative embodiment, the student may choose to subscribe to periodic services such as, for example, period drills and exercises. Specifically, for example, in one embodiment the student may elect to subscribe to a drill of the month service, where a new drill is provided to the student every month.

Additionally, in one embodiment, the student can be provided with an option of selecting a customized home study course based on that student's current abilities and future goals. For example, given a student's current handicap and perceived weaknesses as well as the goals the student would like to achieve (e.g., lower handicap, be more consistent, hit straight off the tee, improve short game, etc.) a customized lesson or even complete study course can be prepared for that student. In the case of a complete course, the course could comprise a plurality of periodic lessons (e.g., weekly, monthly, based on student's availability) designed to achieve the stated goals. Each time, a new lesson can be given to improve an aspect of the student's game according to the lesson plan.

In a step 616, the student's swing motion is captured by capture station 104. One technique for capturing the student's swing is as discussed above with reference to FIGS. 4 and 5. In a step 620 capture station 104 may print a custom swing photo. In this embodiment, student may select a frame of his or her captured swing to be printed as a photograph of that student's swing. The image can be combined with other graphics to create a custom swing photo format. For example, in one embodiment, the image can be combined with text to appear as if the student was captured on the cover of a popular magazine. In one embodiment, the student can select whether to obtain a swing photo.

In a step 624, the captured swing is packaged for transmittal to a remote analysis center 108. In this step, the swing can be bundled with other relevant information such as, for example, the analysis center 108 or instructor chosen to provide the lesson, demographic information of the student, services which may have been selected by the student and other relevant or pertinent information as may be appropriate. In a step 630, the packaged swing is forwarded to a remote analysis center 108 for review.

In a step 634, an instructor at an analysis center 108 retrieves the packaged swing, reviews the swing and prepares a personalized lesson. In this step, the instructor can, for example, add graphics to the swing and overlay voice instructions as part of the lesson. Examples of graphics can include lines, circles or other graphics overlaid onto the swing. Additional items can be provided as part of the lesson including, for example, pre-recorded drills, exercises, instructional clips, example swings by professional or other experienced golfers, pre-recorded lesson clips, commercial or promotional materials, and other data items. Automated tools can also be provided to facilitate lesson preparation.

In a step 638, the swing and the additional data items are packaged and returned to the student. In one embodiment, the lesson is returned to the student at the capture station 104 where the student's swing was captured. In alternative embodiments the lesson can be forwarded to an alternative location such as, for example, the student's home computer, or a capture station at another location. In yet another alternative embodiment, the lesson can be maintained at routing center 112 and later retrieved by the student from any capture station that the student subsequently accesses. Because of these alternative delivery options it is possible, for example, for a student to have his or her swing captured while on vacation and to then have his or her personalized lesson returned to a capture station 104 near the student's home after the student has returned from vacation.

In an embodiment where the completed lesson is maintained at routing center 112, it is possible for the student to log on to any capture station 104 and retrieve the personalized lesson from routing center 112.

In a step 642, the student views the personalized lesson. As stated above, this can be viewed, for example, at capture station 104 or on the user's home computer. In one alternative embodiment, capture station 104 can include a video tape recorder to allow the personalized lesson to be saved on tape. Alternatively, an alternative storage mechanism can be used such as a magnetic or optical disk drive or other storage medium. In this embodiment, the student can purchase the video tape or other medium (alternatively the video tape is included as part of the lesson package) and view the video tape over and over again as the student so desires. In one embodiment, the video tape or media copy is simply a recording of the audio/visual lesson as played for the student.

Figure 7:
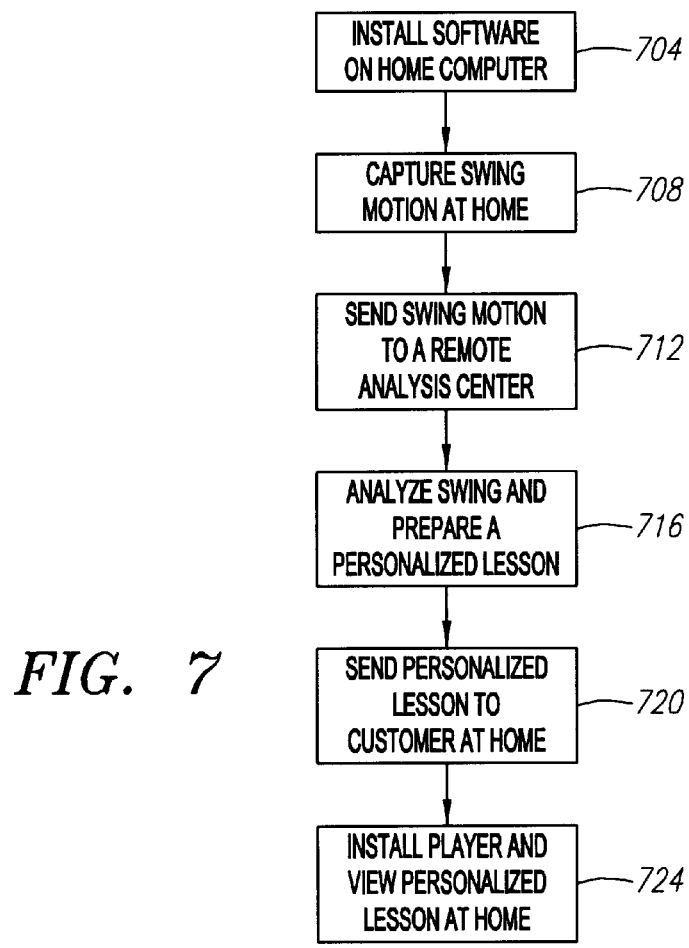
FIG. 7 is an operational flow diagram illustrating a process for providing remote instruction to a student's home according to one embodiment of the invention.

As discussed above, the personalized lesson prepared for the student can be returned to the student and be viewed by the student at a computer such as, for example, the student's personal computer at home or other location. Additionally, in a similar fashion, the student's swing can be captured at the student's personal or other computer in his or her home or other location and the captured swing forwarded to an analysis center 108 where the personalized lesson is prepared an subsequently returned to the student. FIG. 7 is an operational flow diagram generally illustrating a manner in which the remote instruction can be performed without the student having to leave his or her home, office or other location. This process is described in terms of an example where the student chooses to take the lesson in his or her home.

In a step 704, the proper swing capture technology is installed on the student's home computer. This can include any hardware or software used to allow the swing to be captured. In one embodiment, the technology includes the appropriate software and an appropriate trigger mechanism so the swing can be captured and stored, such as in memory or on disk or other storage medium.

In one embodiment, the student can be provided with any hardware or software utilized to allow the student's home computer to perform the functionality of a capture station 104, including playback station capabilities. In one embodiment, these items are provided as part of a package deal. The package can include one or more lessons as well as any updates to the hardware or software which may subsequently issue. Alternatively, the hardware, software and lessons can be available for purchase separately. In yet another alternative, any needed software can be provided to the student free of charge with the idea that revenues can be gained through the student's use of the software in purchasing personalized lessons.

In a step 708, with the appropriate software installed as well as the motion capture technology, the student's swing is captured on his or her home computer. Swing capture technology similar to that disclosed above can be utilized in this step. In a step 712, the captured swing is forwarded to a remote analysis center 108. In the at home embodiment, it is preferred that the swing captured be routed to analysis center 108 via a routing center 112. In this preferred embodiment, the communication mechanism between the home computer and routing center 112 is, for example, the Internet.

As with the retail embodiments disclosed above, the student can be provided with the options of choosing a specific instructor or analysis center, a lesson type, and other options or choices as may be appropriate.

In steps 716, 720 and 724 the personalized lesson is prepared, returned to the student's home and played by the student on his or her home computer. As with the embodiments described above, the personalized lesson can be returned to the customer at any location as designated by the customer or can be left at routing center 112 for subsequent retrieval by the customer as he or she desires. For playback at the student's home computer, the appropriate software used for lesson playback can be provided as part of the original package software package provided to capture the swing motion.

The playback station, either capture station 104 or other playback station, can include motion visualization tools to facilitate navigation through the lesson. Motion visualization tools can include, for example, screen buttons, key strokes or other interface commands that allow the student to play the lesson, fast forward or rewind to a desired point in the lesson, step through the lesson at discrete intervals, go to index points in the lesson, step through or go to a chosen keyframe, or otherwise navigate through the lesson. In one embodiment, a video slide bar is also provided which can be dragged along a path to advance or rewind the lesson, or a part of the lesson.

Figure 8:
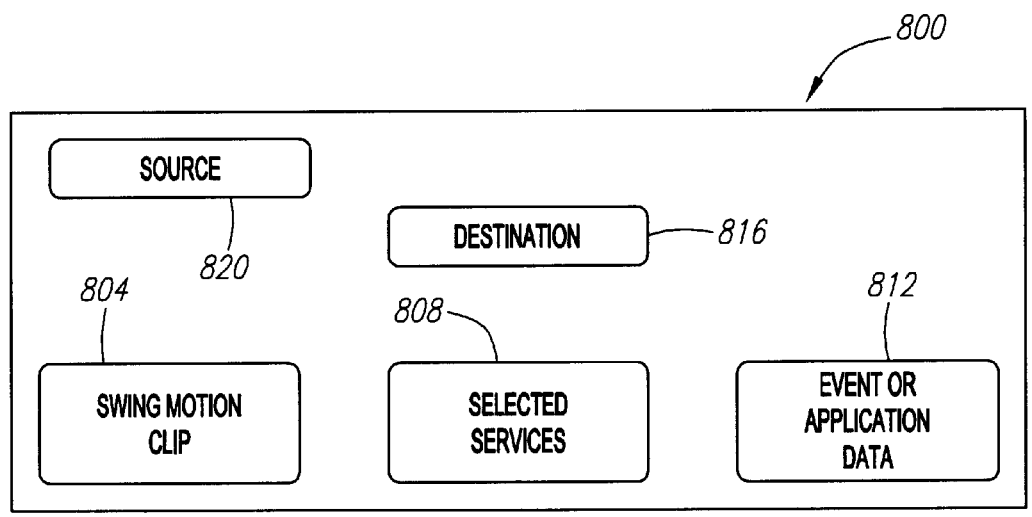
FIG. 8 is a block diagram illustrating an example of data packaging according to one embodiment of the invention.

In the embodiments described above, the student's swing is captured and forwarded to an analysis center 108 with appropriate information to enable a personalized lesson to be prepared and returned to the student. FIG. 8 is a diagram illustrating a package or "envelope" illustrating the information or data that can be included with a captured swing according to one embodiment of the invention. Referring now to FIG. 8, envelope 800 can include a source identification 820, a destination identification 816, a swing motion clip 804, an identification of selected services 808, and event or application data 812.

In one embodiment, a source identification 820 includes a name or other identification of the student whose captured swing is included in the envelope. In addition to or in place of a name, other identification can include, for example, an identification number, a membership number, or other data identifying the student whose swing has been captured. Source identification 820 can also or alternatively include, for example, an identification of a retail site at which the capture station 104 is located, an identification of the capture station 104 used to capture the enclosed swing, the student's address, or any other information identifying the student or the origin of the captured and enclosed swing. Source identification 820 can be provided based on student inputs, information stored in capture station 104, or other data inputs.

Destination identification 816 can include, for example, an identification of an instructor who is going to review the captured swing and provide the personalized lesson. Destination identification 816 can alternatively or also include an identification of a particular analysis station 108 or group of analysis stations 108 at which the personalized lesson will be prepared.

This identification can be provided based on user inputs, based on the capture station 104 or retail site at which the swing was captured, or other information. For example, the student may designate a particular instructor which he or she would like to review the captured swing and prepare the personalized lesson. This can be done for example, while the student is selecting various options in capturing his or her swing. In this embodiment, when the instructor is selected an identification of that instructor is included with envelope 800. In an alternative embodiment, the capture station 104 may be designated as associated with particular analysis centers 108 such that those particular analysis centers 108 typically prepare the personalized lessons for swings captured on those capture stations 104. In this embodiment, a destination identification 816 can be determined based on an identification of the capture station 104 or the retail center or other location at which capture station 104 is located. In this embodiment, this information is used to create destination ID 816. Alternatively, envelope 800 as prepared by capture station 104 can be provided without a destination ID 816. In this embodiment, destination ID 816 can be provided by a routing center 112 based on source identification 820.

Swing motion clip 804 is the swing which was captured using capture station 104. In one embodiment, swing motion clip 804 is a video motion clip which includes the full captured swing which was captured, for example in a circular buffer as discussed above.

Selected services 808 is a set of data indicating which services are to be provided to the student in preparing the personalized lesson. These services can be predetermined, for example, based on an agreement with the retail center or based on a particular level of membership for which the student has signed. Alternatively, services selected can be determined based on options selected by the customer in preparing to capture his or her swing. Information pertaining to selected services can include, for example, the type of lesson requested (a brief standard or long duration lesson, for example) or other service options.

Event or application data 812 can include additional data regarding the captured swing. For example, in one embodiment, capture stations 104 can be utilized to capture swings at an event such as, for example a club tournament. In this embodiment, one or more players in the tournament may chose to have their swings captured and sent to an analysis center 108 to prepare a personalized lesson. In this embodiment, it may be desirable to include an identification of the event, such as the tournament, the club hosting the tournament, or other event information, and to include this information with the envelope as event or application data 812. Event data can be used, for example, to indicate particular services or other information regarding how to handle the personalized lesson based on the fact that it originated from the event.

Figure 9:
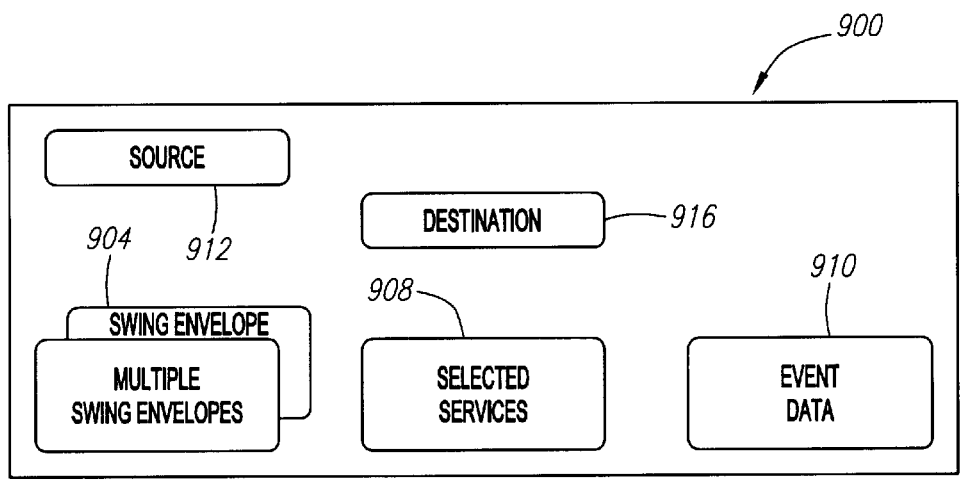
FIG. 9 is a diagram illustrating an example of data packaging having multiple swing envelopes according to one embodiment of the invention.

With events such as those just described, the swing or swings of multiple students can be captured at the event. According to one embodiment, multiple swings captured at the event can be included in a single event envelope and forwarded to an analysis center 108 as a batch. One example implementation of such an event envelope is illustrated in FIG. 9. Referring at FIG. 9, event envelope 900 can include a source identification 912, a destination identification 916, one or more swing envelopes 904, selected services 908 and event data 910. In one embodiment of this invention, source identification 912 can include an identification of the event, the host club, the event manager or other identifying information. Because in a preferred embodiment, the swings from a plurality of students participating in the event are included in a single event envelope 900 it is desired that a single entity be identified as the source of the envelope. As such, the event manager or other appropriate entity can be identified as source 912. Selected services 908 can be identified for each of the swing envelopes 904 included in the event envelope 900 to simplify the preparation of personalized lessons. Alternatively, each swing envelope 904 can specify which of a plurality of selected services are desired.

Event data 910 can include information pertaining to the event such an application of the event or other relevant or pertinent information regarding the event at which the swings were captured.

Figure 10:
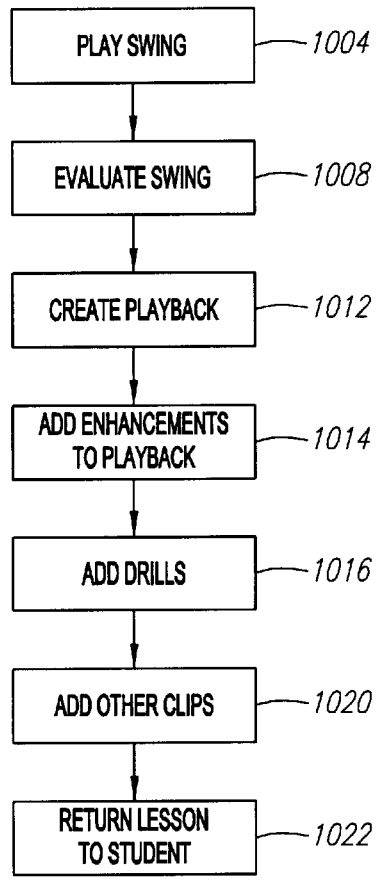
FIG. 10 is an operational flow diagram illustrating a process for preparing a personalized lesson according to one embodiment of the invention.

As described above, an instructor at a remote analysis center 108 reviews the captured swing and prepares a personalized lesson. FIG. 10 is an operational flow diagram illustrating a manner in which the personalized lesson can be prepared according to one embodiment of the invention. In a step 1004, a captured swing is retrieved by analysis center 108 and played for an instructor. Preferably, captured swing is played on a monitor such as, for example, a monitor 312.

In a step 1008, the instructor evaluates the student's swing. In a step 1012, a playback of the student's swing is prepared as part of the personalized lesson. In one embodiment, the playback includes a series of key frames which are still frames of the student's swing and designated parts of the swing. For example, in one embodiment, twelve key frames are utilized, the frames representing: addressing the ball, horizontal back swing, vertical back swing, full back swing, first vertical downswing, horizontal downswing, second vertical downswing, impact, horizontal follow through, vertical follow through, horizontal follow through, and end of swing. These various still frames of the student's swings can be utilized for both swing analysis as well as instructional tools in providing a personalized lesson.

In a step 1014, enhancements are added to the playback which can include, for example, graphics overlaid onto the playback, audio to accompany the playback as well as other features which may enhance the personalized lesson. An example of graphics overlaid onto the playback can include, for example, lines or markings indicating a desired club position in contrast to the actual club position on the playback. Audio added to the playback can include, for example, a narrative by the instructor providing information to the student such as how to improve the swing, tips or hints, background music, or other audio clips.

Enhancements can also include one or more video clips still frames of pro-swings which can be used for comparison purposes with the student's swing. Thus, in this embodiment, the still frames at the various positions of the student's swing can be compared to the pro's swing at those same positions. In this manner, the student can see where his or her swing may need adjustment. The pro-swing can be included to be played back in a split frame or windowed mode such that they can be compared with the student's swing side-by-side. This embodiment is not limited to a dual window application where the student's swing is compared with a single pro swing but can be implemented with any of a plurality of windows such that the student's swing can be compared to more than one pro-swing at the same time.

In a step 1016, drills and exercises, instructional clips where appropriate can be added to the personalized lesson as "homework" for the student. The drills and exercises can be for example, practice drills allowing the student to repeatedly practice a drill which may improve his or her swing. In one embodiment, the drill or exercise can be created by the instructor and packaged with the personalized lesson for return to the student. Alternatively, the instructor can choose from pre-recorded or pre-made drills and exercises which already exist and are stored in memory or other data storage. These prerecorded items can be retrieved and included with the personalized lesson. Alternatively, in order to conserve bandwidth in returning the personalized lesson, an identification of one or more desired drills and exercises can be included with the personalized lesson. This identification would then be used by capture station 104 to retrieve the drills from local storage at capture station 104. In this manner, only identification of the drill needs to be transmitted to the playback station as opposed to transmitting the entire drill.

In a step 1020, additional clips can be included with the personalized lesson. These clips can, for example, be golfing tips or other golf instructional techniques as well as commercial or promotional clips such as announcements and advertisements. Similar to the drills, these clips can be retrieved from storage and provided with a personalized lesson or an identification of a particular clip or clips can be provided to the student with the personalized lesson and the actual clip retrieved from local storage based on the identification. Once the lesson is completed, in a step 1022 it is returned to the student at a designated location such as, for example a capture station 104 or the student's home computer.

In one embodiment, an automated technique can be provided to accommodate the process of spooling or loading the lesson onto a media for communication to the student. In one embodiment, the lesson can be delivered to the student via a communications interface, or on magnetic or optical disk or other media. In these embodiments, the process of loading the lesson onto the media can be automated, such that the instructor does not have to expend time performing this function. Once a lesson is prepared, it can be automatically spooled or loaded to the medium for delivery to the student. In one embodiment, the analysis center 108 can perform this function in the background mode, while the instructor is preparing a subsequent lesson.

Figure 11:
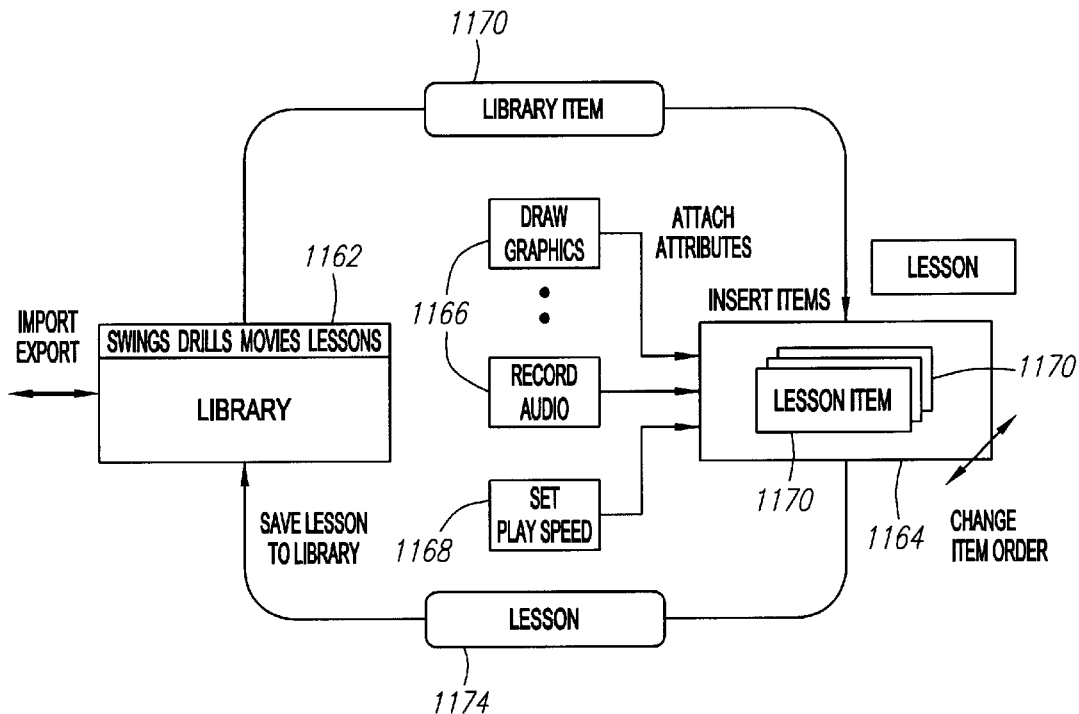
FIG. 11 is a diagram illustrating an example architecture of a lesson editor according to one embodiment of the invention.

FIG. 11 is a block diagram illustrating the creation of a lesson utilizing a lesson editor. According to the embodiment illustrated in FIG. 11, the lesson editor includes at least a library 1162 and a lesson buffer 1164. Utilizing the lesson editor, attributes of each personalized lesson are stored as items in lesson buffer 1164. The lesson buffer are then saved as a complete lesson 1174 in library 1162. Items 1170 can include, for example, swing drills, exercises, movies, pre-recorded lessons, promotional materials, and other prerecorded audio, video, and audio/video clips. Each lesson 1174 can include one or more items 1170A–1170N. In one embodiment, items 1170 are pre-recorded or pre-made and stored in library 1162 for use in lesson creation. Items 1170 can be retrieved from library 1162 and inserted into lesson buffer 1164 as items 1170A–1170N in the personalized lesson being prepared.

As also illustrated in FIG. 11, attributes 1166 such as graphics overlays, instructor voice narratives, and other lesson components can be attached as items 1170A–1170N in lesson buffer 1164. These attributes may be selections made by the instructor in lesson preparation. For example, one item of a personalized lesson in a lesson buffer 1164 can be a student's key frame. An instructor may wish to draw a graphics overlay for this key frame illustrating a desired stance or club position versus the actual stance or club position in the student's key frame. Additionally, the instructor may wish to narrate a discussion explaining the proper stance for club position and the differences between these proper swing components and the student's actual swing components as captured in the key frame. The addition of these example attributes is illustrated by boxes 1166A, 1166N. Of course, additional attributes 1166 can be included as well.

In the above-described embodiment where each item 1170A–1170N of the personalized lesson is stored physically or logically separately, they can be reordered to make a logical presentation. In one embodiment, the control of the order of items 1170A–1170N is up to the instructor at analysis station 108. The instructor can also set other attributes associated with the lesson such as, for example, the play speed of the lesson as illustrated by box 1168. As described previously, once the personalized lesson 1174 is completed it can be stored in library 1162 and subsequently exported to the appropriate playback station.

Figure 12:
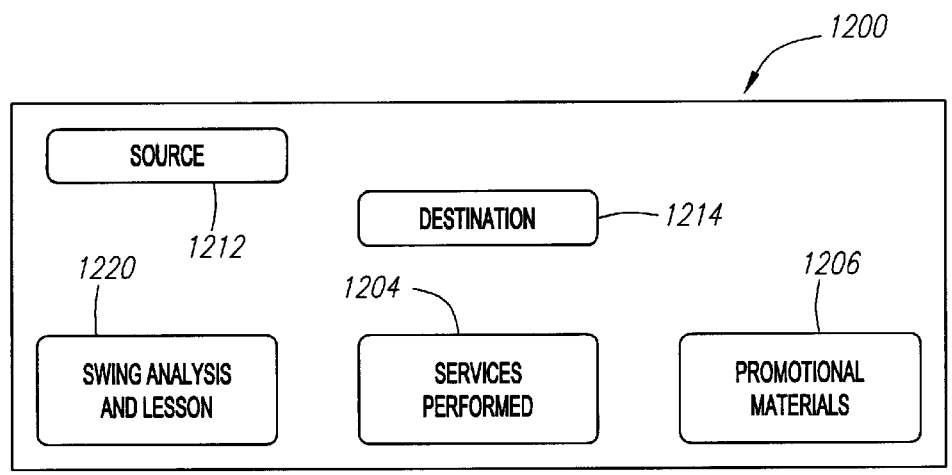
FIG. 12 is a diagram illustrating the packaging of a personalized lesson according to one embodiment of the invention.

In one embodiment, the personalized lesson is packaged in a lesson envelope similar to the swing envelope described above. FIG. 12 is a block diagram illustrating an example lesson envelope 1100 according to one embodiment of the invention. In the illustrated embodiment, lesson envelope 1100 includes a source identification 1112 and a destination identification 1114, the personalized lesson 1120 and identification of services performed 1104 and promotional materials 1106.

In one embodiment, source identification 1112 indicates the instructor or analysis center 108 on which the lesson was prepared. Destination identification 1114 identifies the student for whom the personalized lesson was prepared. Personalized lesson prepared in accordance with FIG. 10, for example, is provided as lesson 1120. Promotional materials 1106 can be included with the personalized lesson and can include news clips, promotional clips, or other materials which may be desired to be included with the personalized lesson.

As disclosed above, in one embodiment a routing center 112 is utilized in conjunction with the Internet to facilitate the transfer of captured swings and personalized lessons between capture centers 104 and analysis centers 108. In this embodiment, the use of envelopes as described above is the preferable technique for packaging swings and personalized lessons. However, it would be apparent to one of ordinary skill in the art after a reading of this description that alternative packaging techniques can be implemented for the Internet or other communications media and that proper selection may depend on the communications media utilized between capture centers 104 and analysis centers 108.

Figure 13:
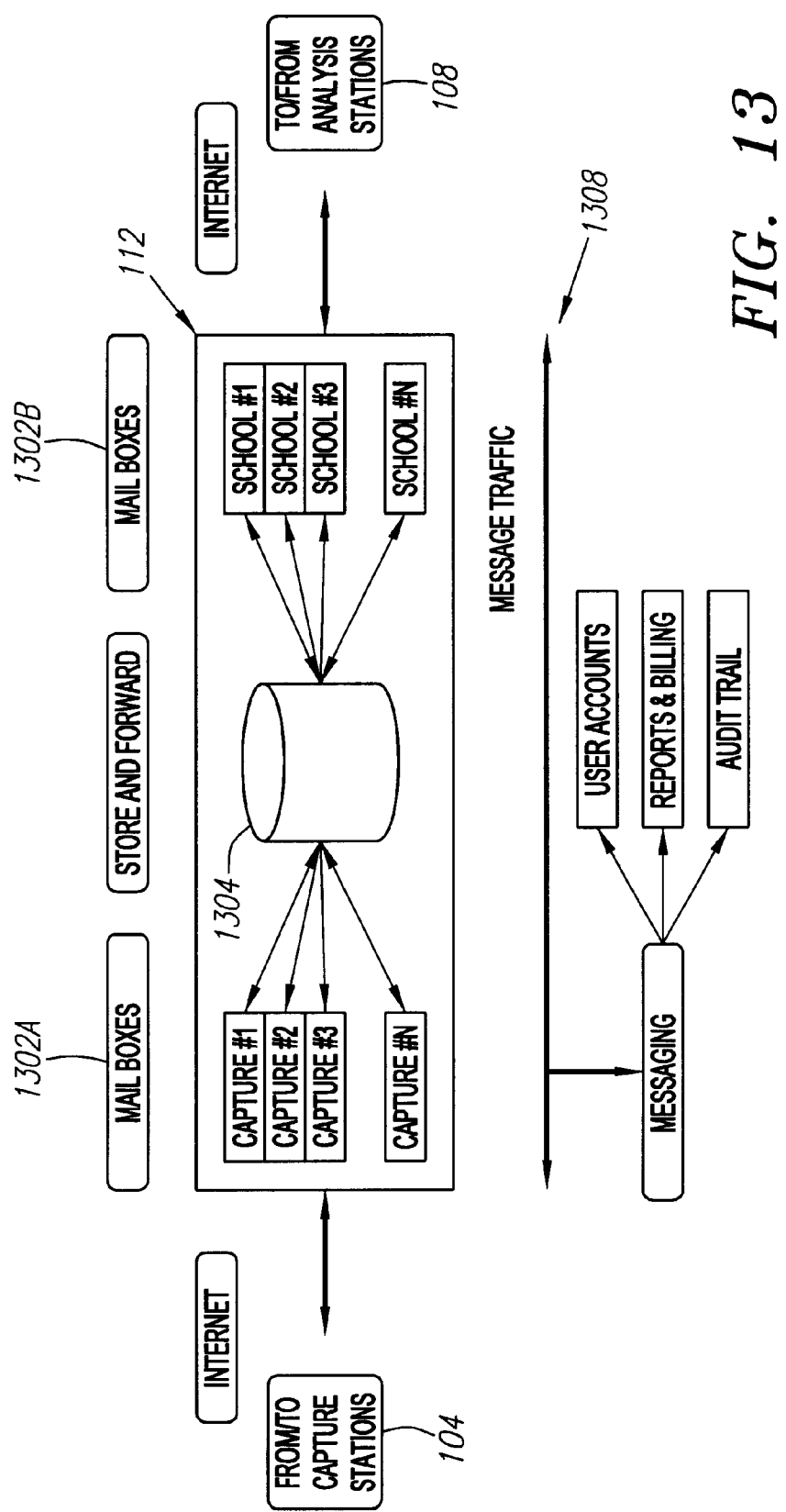
FIG. 13 is a block diagram illustrating an example implementation for a routing center according to one embodiment of the invention.

FIG. 13 is a block diagram illustrating an example implementation of a routing center 112 in accordance with one embodiment of the invention. In the embodiment illustrated in FIG. 13, routing center 112 is configured for implementation utilizing the Internet as the communications medium between capture stations 104 and analysis centers 108. After reading this description, it will become apparent to one of ordinary skill in the art how to implement routing center 112 utilizing alternative communications media.

In the embodiment illustrated in FIG. 13, routing center 112 includes a plurality of mailboxes 1202A, 1202B and a store-and-forward device 1204. In one embodiment, mailboxes 1202A, 1202B and store-and-forward device 1204 can be implemented utilizing conventional server technology. In operation, swings captured at capture stations 104 are delivered to mailboxes 1202A. Store-and-forward device retrieves captured swings from mailboxes 1202A and sends them to analysis stations 108A via mailboxes 1202B. In Internet embodiments, these are forwarded via the Internet.

A personalized lesson prepared at analysis station 108 is sent to mailbox 1202B. Store-and-forward 1204 retrieves the personalized lesson and provides it to the appropriate mailbox 1202A for the capture station 104 on which the message is to be played. Capture station 104 retrieves the prepared message from 1202A and plays the personalized lesson to the student.

When an instructor is ready to prepare a personalized lesson, the instructor retrieves a captured swing from a mailbox 1202B. In the embodiment illustrated in FIG. 13, mailboxes 1202A, 1202B are maintained at routing center 112. An alternative embodiment, mailboxes 1202A, 1202B can be distributed to capture stations 104 and analysis stations 108 respectively.

In one embodiment, message traffic 1208 can be utilized to provide messaging between capture stations 104 and analysis stations 108. For example, messaging can be used for a capture station 104 to indicate to an analysis station 108 that a personalized lesson has been requested. Additionally, once the lesson has been prepared, analysis station 108 can send a message to capture station 104 indicating that the lesson is prepared and can be retrieved from mailboxes 1202A. Messages 1208 can be utilized for purposes such as, for example, to update user accounts, to generate reports and billing, and to create an audit trail. Messages can also be utilized as part of a pre-approval process to verify, for example, that the user's account is current.

In one embodiment, each time a swing is captured, an envelope is prepared and sent to routing center 112. In an alternative embodiment, swing envelopes with a plurality of previously captured swings are prepared and sent in batch form to routing center 112. In this embodiment, at periodic intervals such as, for example, after the close of business, capture stations 104 may prepare swing envelopes for all of the previously captured unsent swings, sign on to routing center 112, and send the envelopes with the unsent captured swings. At the same time, capture station 104 can retrieve completed personalized lessons that are destined for capture station 104. Personalized lessons can then be prepared at analysis center 108 for subsequent replay by the student.

Additionally, capture stations 104 can receive service reports and updates from routing center 112. Examples of updates can include updates to the list of available schools or instructors, fee updates and other service or service-related announcements. System updates can include new pro-swings, drills, exercises, promotions, and so forth as well as new external references, and bug fixes. System updates can also include software updates to update the software at capture station 104. These updates can be received regardless of whether capture station 104 is a capture station at a retail site or whether capture station 104 is implemented on a computer such as the student's home computer.

Figure 14:
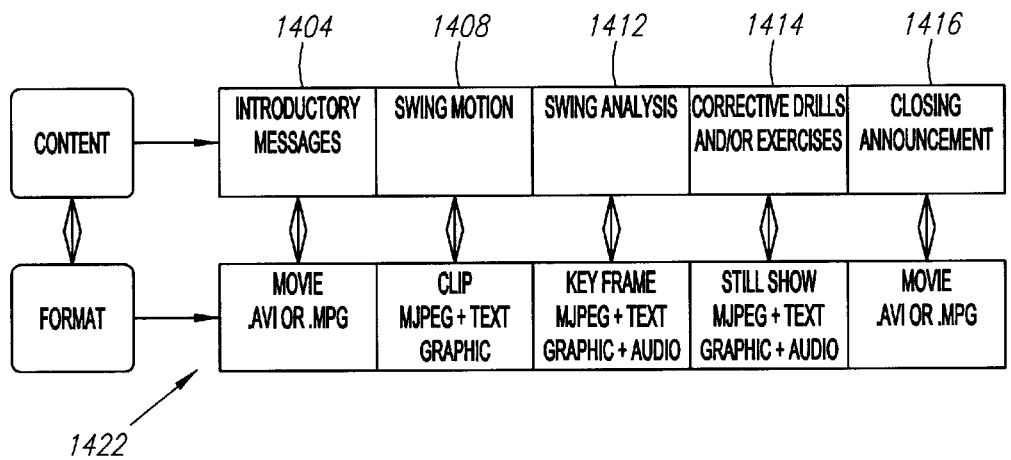
FIG. 14 is a diagram illustrating an example hybrid lesson format according to one embodiment of the invention.

FIG. 14 is a diagram illustrating an example content of a personalized lesson and formats for the content pieces according to one embodiment of the invention. In the example illustrated in FIG. 14, the personalized lesson includes the following items: introductory messages 1304, a swing motion clip 1308, a swing analysis 1312, corrective drills 1314, and a closing announcement 1316. Boxes 1322 illustrate a preferred format for each of these content pieces according to one embodiment. These preferred formats are now described. After reading this description, it will become apparent to one of ordinary skill in the art how to implement the invention utilizing alternative formats and using alternative items.

In the preferred embodiment, introductory messages 1304 are provided in the form of movie or video clips. As such, it is appropriate in playback on a computer that these be files such as .AVI or .MPEG files. To conserve bandwidth, these files can be compressed using, for example, MJPEG, Indeo, Quicktime, or other compression techniques.

Swing motion 1308 is the student's captured swing, which can include graphics and text overlaid onto the original swing motion. Preferably, this format is a .AVI file format with graphic text and timing in separate files.

Swing analysis 1312 is provided in the form of key frames which are a .AVI file with separate graphic text and timing in separate files. The key frames can be compressed utilizing MJPEG or other appropriate compression techniques.

Corrective drills 1314 can be motion videos or stills, and can be dot AVI format with separate files for graphic text timing and audio. A closing announcement 1316 is preferably provided as a movie or video clip in a .AVI or .MPEG file format.

As described above, certain of the items included in the personalized lesson may be stored locally at the playback station. Where this is the case, the lesson format need not include the content of these stored items, but only an identifier so that the playback station can retrieve and play the item in the normal sequence of playing the lesson to the student. The identifier can be, for example, a file name, index number or other appropriate identifier designating the item to be retrieved and played.

Although the format illustrated in FIG. 14 includes particular and specific items such as, for example, corrective drills and a closing analysis, alternative or additional items can be included as discussed above. These alternative items can include, for example, other audio or video materials as well as commercial or promotional materials.

The lesson content and format illustrated in FIG. 14 is referred to as a hybrid lesson format in that it includes a plurality of alternative file formats concatenated or otherwise merged together to make up a single lesson. This hybrid lesson format provides certain advantages which are now described. If the personalized lesson was prepared as a full motion video lesson and returned to the student as a complete motion video clip, the entire lesson would require, for example, 200 megabits of data for each minute of motion video. Thus, the storage and transmission requirements of a full motion video lesson could become quite large. However, because the hybrid lesson format is implemented, full motion video is not required for the entire lesson. As such, the amount of data required to provide the personalized lesson to the student can be decreased dramatically.

Instead, according to one embodiment, only full motion video is provided where necessary. Other parts of the lesson, such as key frames, graphics overlays and other items can be provided as still images, which require less bandwidth to download. At the playback station, the video and still images can be played back in a defined sequence, with, for example, still graphics being overlaid onto still images to create the appearance to the student as if a full motion video is being played back. Additionally, prerecorded library items can be designated in the format with a proper identification or designation. Upon playback, the identified library item is retrieved from local storage and played to the student in the sequence it occurs in the lesson. Thus, through piecing together various items of differing formats, it appears to the student as if the lesson itself is a full motion video, when in fact, it is made up of a plurality of data items of differing formats, some of which may, but need not be full motion video.

One area where data savings are obtained is in the swing analysis portion of the lesson. As fully discussed above, swing analysis can be accomplished utilizing key frames of the student's swing. Because these key frames are still frames they only need to be generated, stored and transmitted once for each frame. They do not need to be regenerated as they would for full motion video at a frame rate of, for example, 30 frames per second. Additionally, as discussed above, corrective drills, closing announcements, introductory messages, promotional materials, and other information can be stored locally at capture stations 104. In this embodiment, only an identification or address of the message, drill, announcement, or other material to be included in the lesson needs to be provided. This indication or address is then used to retrieve the appropriate clip from local storage and to play that clip at the proper time during lesson playback. With these savings, the average data rate required for playback and transmission of a multimedia lesson can be reduced from 200 megabits per minute to 5 megabits per minute on average.

As described above, according to one embodiment the student's swing is captured as a series of still frames, referred to as key frames. In the described embodiment there are twelve key frames corresponding to twelve critical positions of the student's swing, although other quantities are possible. These twelve frames correspond to the takeaway, the parallel backswing, the vertical portion of the backswing, the top of swing, the start of the downswing, the vertical downswing, the parallel downswing, impact, the parallel follow-through, the vertical follow-through, the second parallel follow-through, and the end of the swing.

In one embodiment, the points in the swing to be designated as key frames are chosen as a linear interpolation of the swing. However, the critical positions of the swing do not generally occur at evenly-spaced linear time intervals. Additionally, for each of the different swings (e.g. such as the full swing, half swing, putt) the swing tempo is different. As such, the critical positions occur at different time intervals from the starting point.

Therefore, to properly identify the key frames for each swing type, the time at which each critical position occurs for each swing type is defined. More specifically, in one embodiment, each critical position (and hence its associated key frame) is defined as occurring at a predetermined time from the start of the. Consider an example embodiment where a three second swing clip is stored in a buffer at a frame rate of 60 frames per second. In this example, the entire swing can be stored on 180 frames. Each key frame can be designated as one of those 180 frames, depending on the type of swing. Table 1 lists each critical position and the corresponding frame at which that position occurs for each of a half swing, a full swing, and a putt.

Because the critical positions are not evenly spaced in a swing, that the key frames do not divide the full swing at even time intervals. In fact, the last column in Table 1 indicates a corresponding frame number for a linear temporal division of the entire swing. This illustrates the difference between a straight linear division and the non-linearly defined critical positions for each listed swing type.

TABLE 1

| KEY FRAME # | CRITICAL POSITION | FULL SWING | HALF SWING | PUTT | LINEAR |
|---|---|---|---|---|---|
| 0 |  | 0 | 0 | 0 | 0 |
| 1 | Take Away | 60 | 60 | 60 | 15 |
| 2 | 1st Parallel | 77 | 74 | 72 | 30 |
| 3 | 1st Vertical | 94 | 87 | 84 | 45 |
| 4 | Top of Swing | 108 | 98 | 93 | 60 |
| 5 | Start Down | 110 | 100 | 95 | 75 |
| 6 | 2nd Vertical | 113 | 107 | 103 | 90 |
| 7 | 2nd Parallel | 118 | 114 | 112 | 105 |
| 8 | Impact | 120 | 120 | 120 | 120 |
| 9 | 3rd Parallel | 122 | 126 | 128 | 135 |
| 10 | 3rd Vertical | 130 | 136 | 140 | 150 |
| 11 | 4th Parallel | 153 | 156 | 162 | 165 |
| 12 | End of Swing | 180 | 180 | 180 | 186 |

Figure 15:
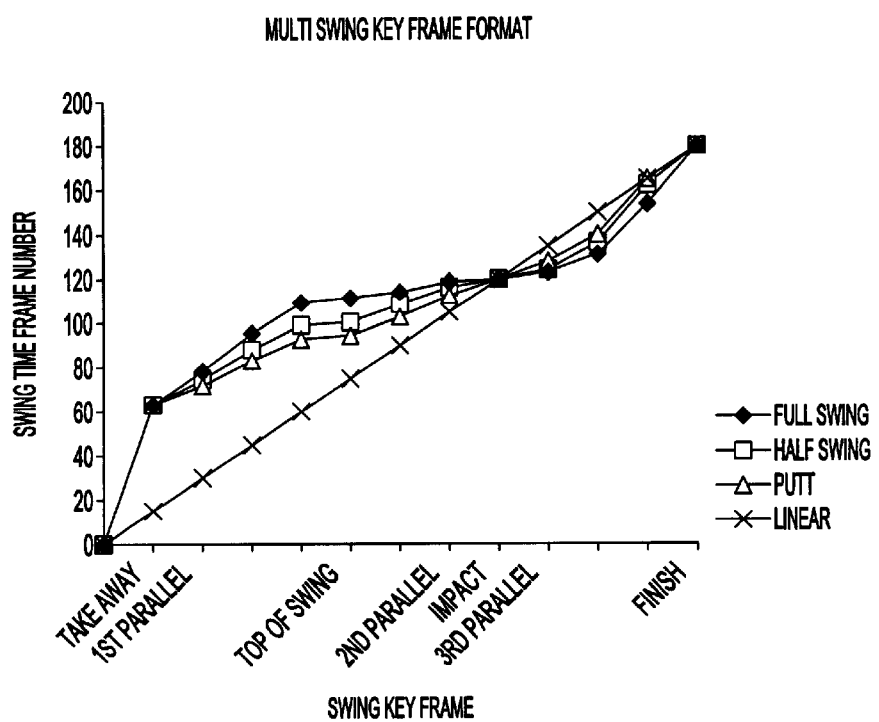
FIG. 15 is a diagram illustrating key events for various swing types as a function of time (or frame number) according to one embodiment of the invention.

FIG. 15 is a diagram illustrating the time (or number of frames) at which each defined critical position occurs for each swing in contrast with a linear division of the entire swing. As illustrated, the full swing has the slowest backstroke of the group with a top of the swing (key frame 4) occurring at the 108th frame. However, full swing has the quickest tempo between the top of swing (key frame 4) and impact (key frame 8).

One advantage of the non-linear approach to defining key frames is that the critical positions can be more accurately captured as key frames. Also, the critical positions can be uniquely defined for each type of swing, thus more accurately representing the swing type.

During playback of the student's swing, a slide bar can be utilized to fast-forward or review the swing. In one embodiment, the playback station includes a series of pre-defined buttons that correspond to the critical positions. In one embodiment, the buttons are screen buttons that can be selected by, for example, mouse-clicking on a desired button. Clicking a button automatically advances or reviews playback to the keyframe corresponding to the selected position. In one embodiment, the slidebar is implemented in a non-linear fashion to correspond to the identified key frames. For example, with a linear slide bar, constant motion of the bar along its path results in a constant advance or review of the motion video. However, in a non linear embodiment, a constant advance of the slide bar results in a nonlinear response of the video. For example, moving the slide bar to a position which would linearly correspond to the 60th frame (key frame 4), brings the full swing video to the 108th frame.

Although FIG. 15 and Table 1 illustrate an example implementation or definition of the occurrence of the defined key frames, after reading this description one of ordinary skill in art can determine how to fine tune or adjust these key frame positions.

As discussed throughout this document, there are numerous applications of the invention herein described including applications where all or part of the functionality of capture stations 104 can be located at various locations accessible to a student. This also includes, playback stations, whether or not those playback stations can also function as capture stations. Because of the ubiquitous character of these capture stations and playback stations, there are various scenarios which can be considered to obtain payment for the services rendered.

In a retail embodiment, for example, the retail establishment may have a house account established and the retail establishment pays for the lessons. These payments can be on a number of different schedules, such as, for example, on a flat, monthly or periodic fee, or in a per lesson basis. In this embodiment, the patron would simply pay the retail establishment for the lesson. In this embodiment, the patron would simply pay the retail establishment for the lesson. In this embodiment, after purchasing a lesson, the patron can be provided with an access number, tokens, or other means to allow the patron to access capture station 104, capture his or her swing and forward the swing to an analysis center 108 for instruction.

Alternatively, capture station 104 may include means for accepting payment such as a credit card reader, atm card reader, or other payment means. As another example, where a capture station 104 is located in a facility associated with a hotel or resort, the student can simply charge the lessons to his or her room.

As briefly mentioned above, according to one embodiment of the invention the student's swing can be captured at the student's home computer. There are several different business models by which such an embodiment can be implemented. In accordance with one model, the student can establish an account and sign up for one or a series of lessons to be taken. A student is provided with software necessary to enable swing capture, swing packaging, receipt of the lesson, and playback of the lesson at his or her own computer. In accordance with one embodiment, as part of the package the student can purchase the necessary hardware such as a video camera, sound detector and interface cards to enable the computer to capture the swing.

In one embodiment of the invention, the student may also be provided with a supplemental library which includes pre-recorded drills, pre-recorded swings of professional or other experienced golfers, commercial messages, and other data items. In one embodiment, these library items are provided to the student on a CD-ROM or via other computer readable medium such that they can be accessed by the student or accessed by the student's personal lesson during lesson playback. These library items can be updated periodically through either a purchase plan, a membership arrangement, or other business arrangement.

The various embodiments of the invention described above may be implemented using hardware, software or a combination thereof and may be implemented in a computer system or other processing system. In fact, in one embodiment, these elements are implemented using a computer system capable of carrying out the functionality described with respect thereto. An example computer system is such as that illustrated in FIG. 3.

Figure 16:
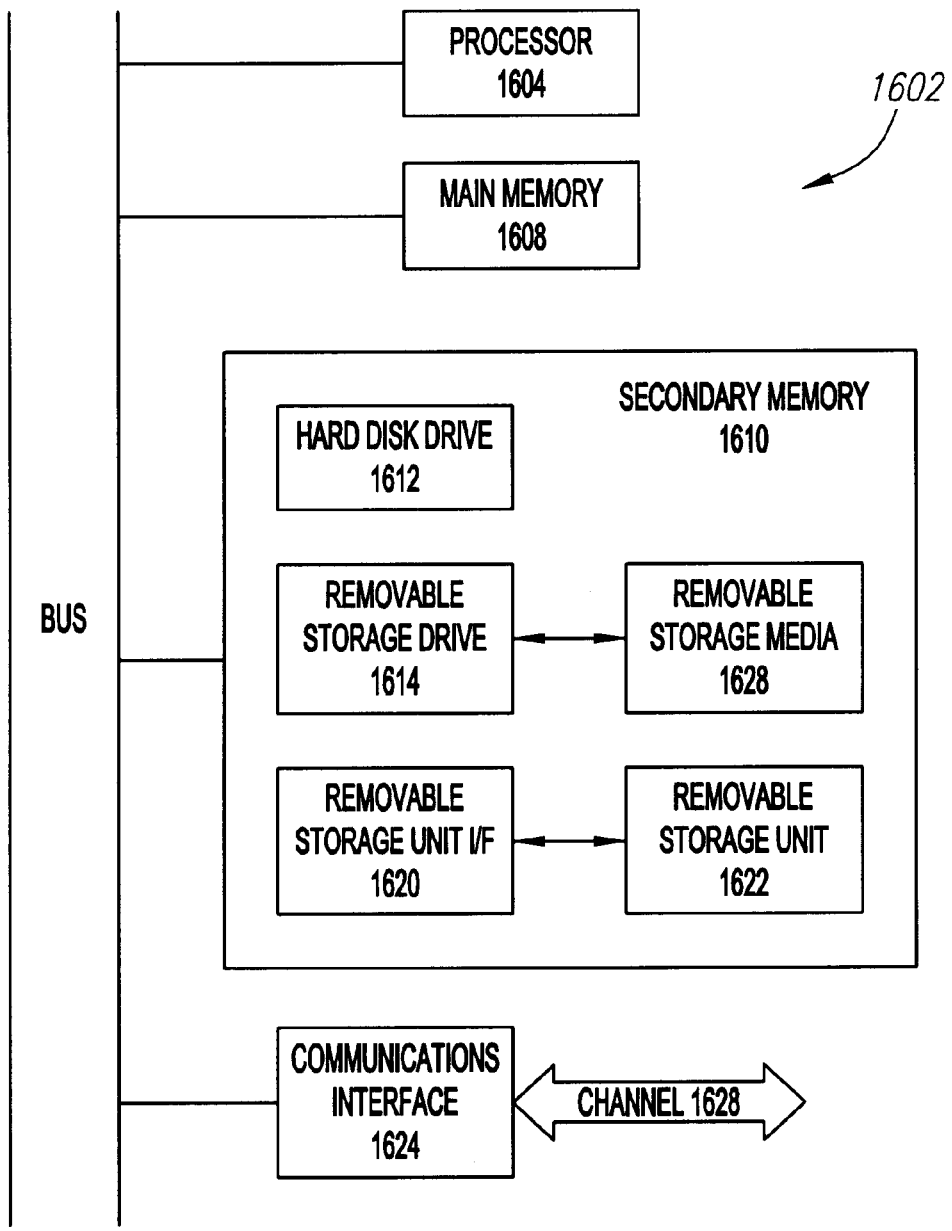
FIG. 16 is a block diagram illustrating an example computer system in which elements and functionality of the invention are implemented according to one embodiment of the invention.

FIG. 16 is a block diagram illustrating a general purpose computer system, including examples of computer readable media for providing computer software or instructions to perform the functionality described herein. The illustrated computer system 1602 includes one or more processors, such as processor 1604. The processor 1604 is connected to a communication bus 1606. Various software embodiments are described in terms of this example computer system. After reading this description, it will become apparent to a person skilled in the relevant art how to implement the invention using other computer systems or computer architectures, including, for example, the architecture illustrated in FIG. 1.

Computer system 1602 also includes a main memory 1608, preferably random access memory (RAM), and can also include a secondary memory 1610. The secondary memory 1610 can include, for example, a hard disk drive 1612 and/or a removable storage drive 1614, representing a floppy disk drive, a magnetic tape drive, an optical disk drive, etc. Removable storage drive 1614 reads from and/or writes to a removable storage medium 1618. Removable storage media 1618, represents a floppy disk, magnetic tape, optical disk, etc. which is read by and written to by removable storage drive 1614. As will be appreciated, the removable storage media 1618 includes a computer-usable storage medium having stored therein computer software and/or data.

In alternative embodiments, secondary memory 1610 may include other similar means for allowing computer programs or other instructions to be loaded into computer system 1602. Such means can include, for example, a removable storage unit 1622 and an interface 1620. Examples of such can include a program cartridge and cartridge interface (such as, for example, that found in video game devices), a removable memory chip (such as, for example, an EPROM, PROM or other memory device) and associated socket, and other removable storage units 1622 and interfaces 1620 which allow software and data to be transferred from the removable storage unit 1622 to computer system 1602. In some embodiments, removable storage unit 1622 may be affixed permanently to removable storage unit interface 1520.

Computer system 1602 can also include a communications interface 1624. Communications interface 1624 allows software and data to be transferred between computer system 1602 and external devices. Examples of communications interface 1624 can include a modem, a network interface (such as an Ethernet card), a communications port, a PCMCIA slot and card, etc. Software and data transferred via communications interface 1624 are in the form of signals which can be electronic, electromagnetic, optical or other signals capable of being received by communications interface 1624. These signals are provided to communications interface via a channel 1628. This channel 1628 carries signals and can be implemented using a wireless medium, wire or cable, fiber optics, or other communications medium. Some examples of a channel can include a phone line, a cellular phone link, an RF link, a network, the Internet, and other communications channels.

In this document, the terms "computer program medium" and "computer usable medium" are used to generally refer to media such as removable storage media 1618, a hard disk installed in hard disk drive 1612, removable storage unit 1622 and signals on channel 1628. These terms can also refer to main memory 1608 where memory 1608 stores a computer program or a part thereof. These computer program products are means for providing software to computer system 1602.

Computer programs or instructions (also called computer control logic) can be stored in main memory 1608 and/or secondary memory 1610. Computer programs can also be received via communications interface 1624. Such computer programs, when executed, enable the computer system 1602 to perform the features of the present invention as discussed herein. In particular, the computer programs, when executed, enable the processor 1604 to perform the features of the present invention. Accordingly, such computer programs represent controllers of the computer system 1602.

In an embodiment where the elements are implemented using software, the software may be stored in a computer program product and loaded into computer system 1602 using removable storage drive 1614, removable storage unit 1622, hard drive 1612 or communications interface 1624. The control logic (software), when executed by the processor 1604, causes the processor 1604 to perform the functions of the invention as described herein.

In another embodiment, the elements are implemented primarily in hardware using, for example, hardware components such as application specific integrated circuits (ASICs). Implementation of the hardware state machine so as to perform the functions described herein will be apparent to persons skilled in the relevant art(s). Although not a "computer program" in the traditional sense, the hardware components can be thought of as a computer program medium (albeit, perhaps hard-wired) which enables the system to perform the described functions. In yet another embodiment, elements are implemented using a combination of both hardware and software. In this embodiment, the combination of the hardware and software can likewise be thought of as a computer program medium which enables the system to perform the described functions.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus for preparing a personalized golf swing lesson for a student whose golf swing has been captured on a computer, the system comprising:

means for combining, at an analysis station, attributes with said captured golf swing, wherein said attributes include at least one of graphic overlays and audio comments;

means for appending, at said analysis station, one or more additional items to the personalized lesson to create a hybrid lesson format, at least one of said one or more additional items represented by an identifier identifying said additional item which is stored in local storage at a remote server or a playback station; and means for returning said personalized lesson and said one or more additional items from said analysis station to the student for playback.

2. The apparatus of claim 1, wherein said additional items comprise at least one of the group of practice drills, exercises, instructional clips, ideal motion models and promotional materials.

3. An apparatus for creating a hybrid video presentation for playback by a user, the system comprising:

means for creating a first item having a first format type;

means for creating a second item having a second format type wherein said second item is an identifier identifying a video item to be retrieved from a remote server or a playback station during playback of the hybrid video presentation; and means for combining, at an analysis station, said first item with said second item to create a hybrid video item;

wherein said combined items are played by a playback station in sequence as if said hybrid video presentation is a single full motion video presentation.

4. The apparatus of claim 3, further comprising means for transmitting said hybrid video item to the user across a communications channel.

5. The apparatus of claim 3, wherein said first format is a full motion video format.

6. The apparatus of claim 5, wherein said second format is a still image format.

7. A method for creating a hybrid video presentation for playback by a user, comprising:

creating a first item having a first format type;

creating a second item having a second format type wherein said second item is an identifier identifying a video item to be retrieved from a remote server or a playback station during playback of the hybrid video presentation; and combining, at an analysis station, said first item with said second item to create a hybrid video item;

wherein said combined items are played by a playback station in sequence as if said hybrid video presentation is a single full motion video presentation.

8. The method of claim 7, further comprising a step of transmitting said hybrid video item to the user across a communications channel.

9. The method of claim 7, wherein said first format is a full motion video format.

10. The method of claim 9, wherein said second format is a still image format.

11. A hybrid format for representing a video lesson which is transported from a first location to a second location across a communication channel, the hybrid format comprising a first item having a first format type and a second item having a second format type, wherein said second item is an identifier identifying a video item to be retrieved from a remote server or a playback station during playback of the hybrid video presentation, and wherein said first and second data items are combined into a single lesson at said first location.

* * * * *